(12) United States Patent
Ondusko

(10) Patent No.: US 6,594,939 B2
(45) Date of Patent: Jul. 22, 2003

(54) FISH MEASURING DEVICE

(76) Inventor: Joseph Ondusko, 1215 Keene Road, Peterborough, Ontario (CA), K9J 6X9

( * ) Notice: Subject to any disclaimer, the term of this patent is extended or adjusted under 35 U.S.C. 154(b) by 0 days.

(21) Appl. No.: 10/107,164

(22) Filed: Mar. 28, 2002

(65) Prior Publication Data

US 2003/0106254 A1 Jun. 12, 2003

(30) Foreign Application Priority Data

Dec. 6, 2001 (CA) .............................. 2364534

(51) Int. Cl.⁷ .................... A01K 97/00; G01B 5/02
(52) U.S. Cl. ...................... 43/4; 33/464; 33/484; 33/485; 33/511
(58) Field of Search .................... 43/4, 1; 33/483, 33/484, 485, 494, 511, 549, 555, 464; D22/134, 149; 220/4.32, 4.28, 578; 206/0.8, 0.81

(56) References Cited

U.S. PATENT DOCUMENTS

| | | | | |
|---|---|---|---|---|
| 233,203 A | * | 10/1880 | Cushman | 33/483 |
| 1,130,978 A | * | 3/1915 | Jackson | 206/0.8 |
| 1,378,227 A | * | 5/1921 | Greenstreet | 206/0.8 |
| 1,474,804 A | * | 11/1923 | Tyrell | 33/511 |
| 2,429,871 A | * | 10/1947 | Masters | 33/485 |
| 2,816,750 A | * | 12/1957 | Martin | 43/4 |
| 3,259,988 A | * | 7/1966 | Lunn | 33/511 |
| D220,395 S | * | 4/1971 | Garelli | D22/149 |
| 3,635,396 A | * | 1/1972 | Palfi | 33/464 |
| D241,641 S | * | 9/1976 | Brown et al. | D22/149 |
| 4,495,709 A | * | 1/1985 | Mainenti | 33/484 |
| 4,630,745 A | * | 12/1986 | Shiotani | 220/4.28 |
| 4,939,849 A | * | 7/1990 | Johnson | 33/512 |
| D316,665 S | * | 5/1991 | Lueth | D22/134 |
| 5,012,943 A | * | 5/1991 | King | 220/4.32 |
| 5,097,617 A | * | 3/1992 | Craven | 43/4 |
| 5,148,607 A | * | 9/1992 | Lasiter | 43/4 |
| D337,062 S | * | 7/1993 | Sanders | D10/70 |
| 5,228,226 A | * | 7/1993 | Porosky | 33/485 |
| D348,405 S | * | 7/1994 | Storey et al. | D10/70 |
| 5,339,532 A | * | 8/1994 | O'Keefe | 43/4 |
| D369,115 S | * | 4/1996 | Mitchell | D10/70 |
| 5,526,575 A | * | 6/1996 | Hoover et al. | 43/4 |
| 5,637,838 A | * | 6/1997 | Arey et al. | 33/484 |
| 5,873,171 A | * | 2/1999 | Hsu | 33/484 |
| 5,970,620 A | * | 10/1999 | Campbell | 33/511 |
| 5,974,678 A | * | 11/1999 | Landauer | 33/512 |
| 6,115,932 A | * | 9/2000 | Fedora | 33/494 |
| 6,134,798 A | * | 10/2000 | Duncan et al. | 33/484 |
| 6,256,896 B1 | * | 7/2001 | Landauer | 33/512 |
| 6,415,521 B1 | * | 7/2002 | Schnell | 33/485 |

* cited by examiner

*Primary Examiner*—Darren W. Ark

(57) ABSTRACT

The present invention relates to a fish measuring device manufactured from environmentally friendly material and will reduce the manhandling of fish that need to be returned to the water as the fish can be quickly placed into the fish measuring device, an accurate measurement taken and finally, live released as required. The fish measuring device comprises a base member having top and bottom surfaces, first and second sides and first and second ends, side containment means and means for connecting the side containment means to the top surface of the base member, said side containment means providing a fish containment trough and a scale provided within said fish containment trough; and means for extending the fish containment trough to measure larger fish.

11 Claims, 3 Drawing Sheets

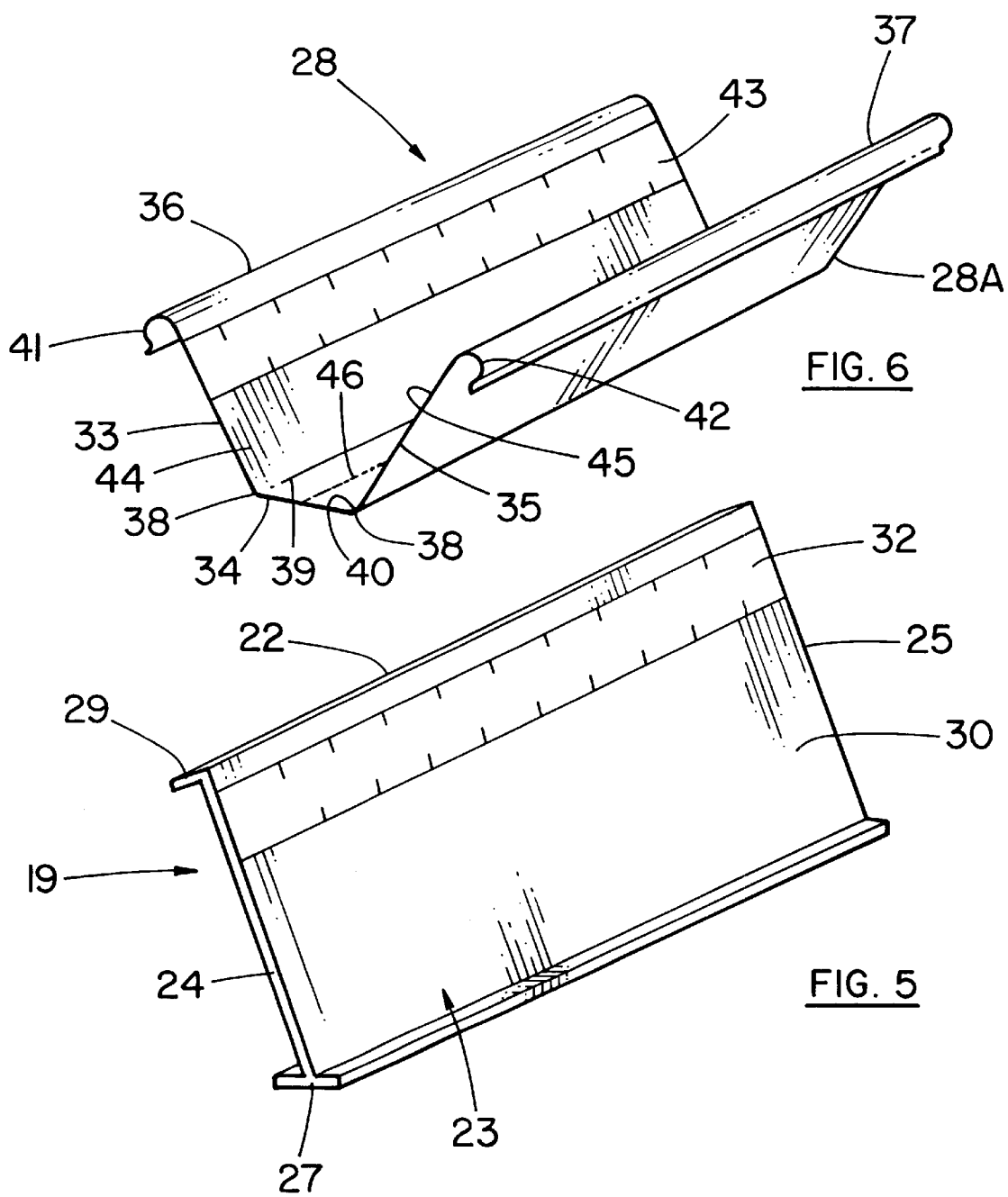

FISH MEASURING DEVICE

BACKGROUND OF THE INVENTION

1. Field of the Invention

This invention relates to an apparatus to measure the length of a fish. In particular the present invention provides an accurate and user-friendly fish measuring device.

2. Description of the Prior Art

Conservation regulations prescribing certain length limitations on fish which may be kept, increased awareness of preserving our fisheries, infractions of fishing regulations and associated severity of penalties have all contributed to the need for an accurate and user-friendly fish measuring device.

U.S. Pat. No. 5,097,617 describes an apparatus for measuring fish. It consists of an elongated V-shaped trough. Both ends of the trough are closed. Indicia on the sides of the trough provide the length of the fish from one end of the trough and can also be marked with the legal limit for different species. However this device will not facilitate the live release of fish that are under the limit. In addition it is not easily transported or stored.

Other devices for fish measuring are shown in U.S. Design Pat. No. 348,405; U.S. Pat. No. 5,339,532; U.S. Design Pat. No. 369,115; U.S. Pat. No. 5,526,575; U.S. Pat. No. 5,637,838 and U.S. Pat. No. 6,115,932. None of these prior art devices facilitate the live release of fish that are under the limit and are not easily transported or stored.

SUMMARY OF THE INVENTION

It is an object of the present invention to provide a fish measuring device that will reduce the manhandling of fish that need to be returned to the water and permit live release as required.

It is a further object of the present invention to provide a fish measuring device that can be easily transported and stored.

It is a further object of the present invention to provide a fish measuring device that can measure both smaller and larger fish.

In accordance with the present invention there is provided a fish measuring device comprising a base member having top and bottom surfaces, first and second sides and first and second ends, side containment means and means for detachably connecting the side containment means to the top surface of the base member, said side containment means providing a fish containment trough and a scale provided within said fish containment trough; and means for extending the fish containment trough to measure larger fish.

The fish measuring device of the present invention reduces the time the fish is out of the water thereby increasing it's chances of survival. If the fish must be released the fish measuring device of the present invention is put into the water to permit the fish to swim away. In addition the fish measuring device of the present invention, has detachable components that easily assembled and unassembled to facilitate transport and storage.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 5 is a perspective view of a side member of the fish measuring device of FIG. 1;

FIG. 6 is a perspective of a sleeve member of the fish measuring device of FIG. 1.

DETAILED DESCRIPTION OF THE PREFERRED EMBODIMENT

Figure 1:
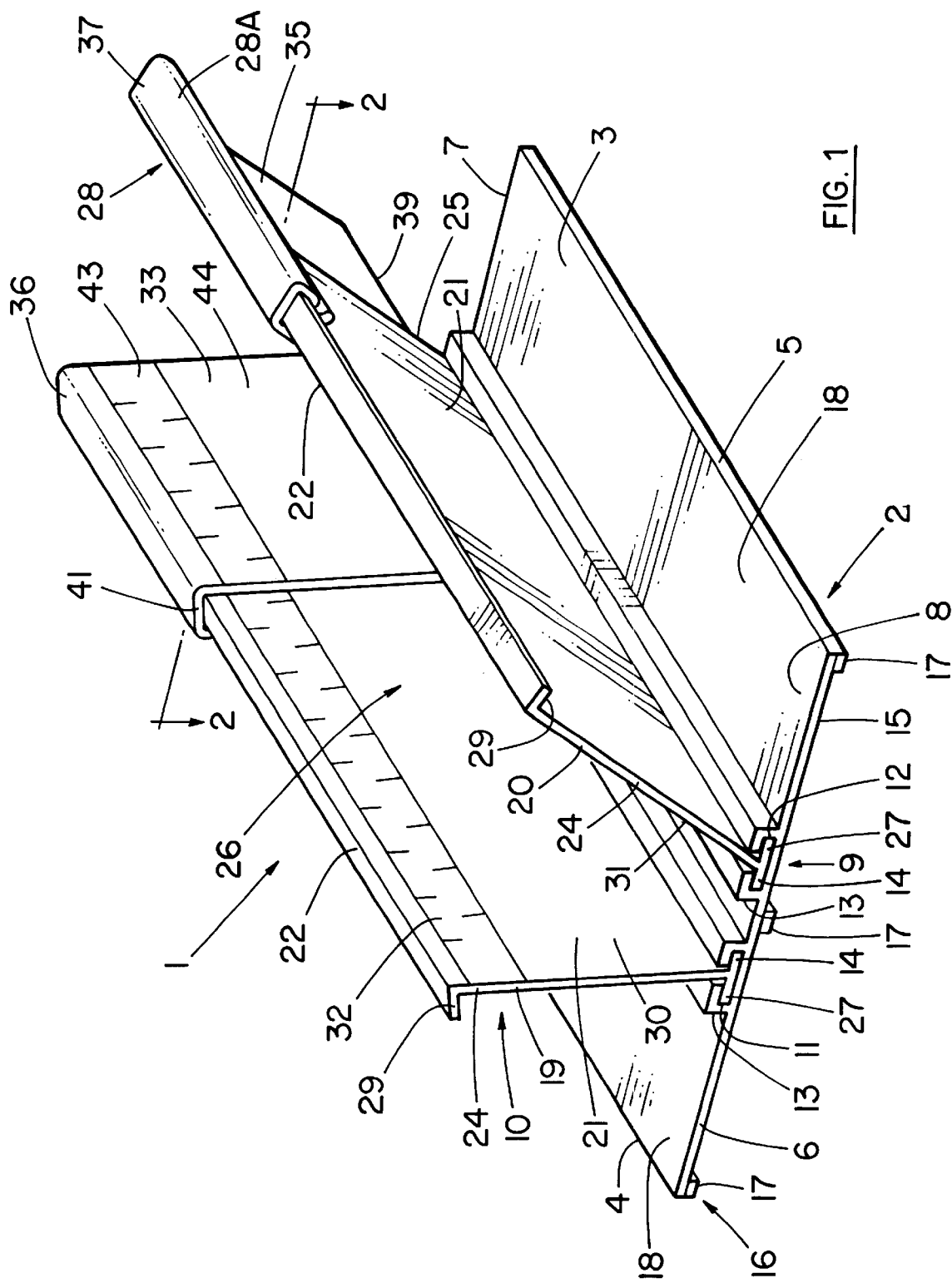
FIG. 1 is a perspective view of one embodiment of a fish measuring device including a base member, two opposing side members to form a fish containment trough and a sleeve to act as means for extending the fish containment trough to measure larger fish according to the present invention.
Figure 2:
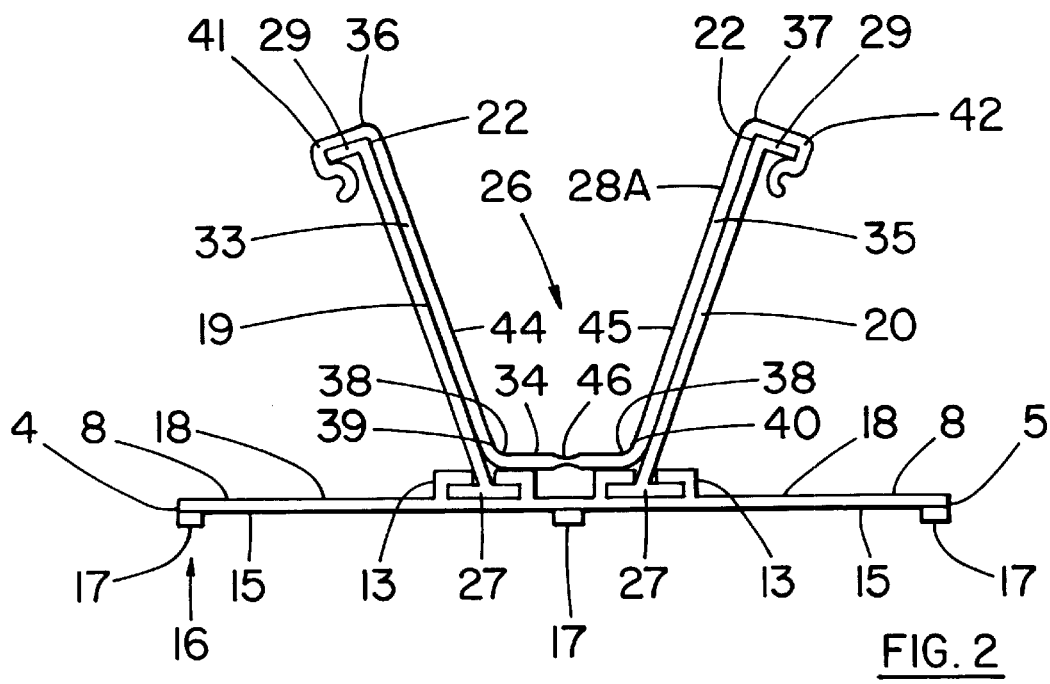
FIG. 2 is an cross sectional view of the fish measuring device of FIG. 1 along line 2—2.
Figure 3:
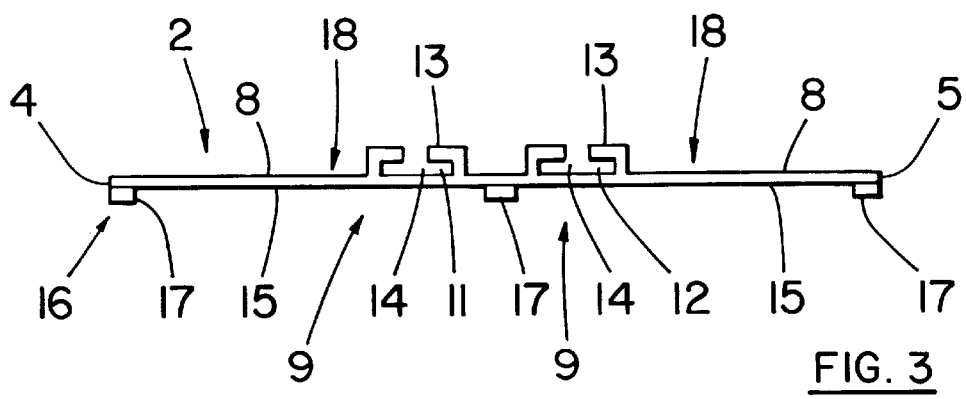
FIG. 3 is an end plan view of the base member of the fish measuring device of FIG. 1.
Figure 4:
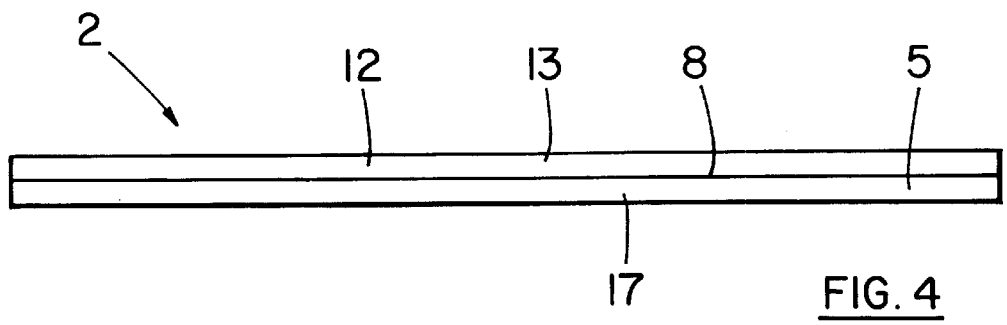
FIG. 4 is a side plan view of the base member of FIG. 3.

Referring to FIGS. 1 to 6 one embodiment of a fish measuring device according to the present invention is generally indicated at 1. The fish measuring device 1 has a base member 2. In the embodiment illustrated, the base member 2 has a generally flat rectangular section 3 having left and right sides 4, 5 and first and second ends 6,7. For easy of portability of the base member 2 of the fish measuring device in the embodiment shown, preferably has a width of about five and half inches and is about twenty two inches long. On the top surface 8 of base member 2 means, generally indicated at 9, are provided to detachably connect side containment means 10 along the length of base member 2. In the embodiment shown the means 9 for detachably connecting the side containment means 10 comprise two raised parallel channels 11, 12 running the full length of the base member 2. Each of the raised channels 11, 12 has peripheral walls 13 that define an inverted T shaped slot 14 into which a corresponding tab portion on the side containment means 10 can be slid. The raised channels 11, 12 are one inch apart in the embodiment shown. In the present invention the means 9 for detachably connecting the side containment means to the base member is not restricted to two raised channels. The means for detachably connecting the side containment means can for example consist of one or more slots or grooves formed in the top surface of the base member. The slots or grooves can be a number of different shapes such as oval, dove tail, rectangular, etc so long as they cooperate with a corresponding portion of the side containment means. The side containment means can slide into the slots or grooves on the top surface of the base member or have locking tabs that can be inserted into slots to retain the side containment means in place while in use and permit detachment from the base member during transport or for storage.

On the bottom surface 15 of base member 2 are preferably provided support sections 16. In the embodiment illustrated in FIGS. 1 to 6, the support sections 16 comprise three parallel depending legs 17 running the full length of the base member 2. The legs 17, as shown, have a square cross section (quarter inch square) and run the full length of the base. Other cross sections are possible and the legs don't have to run the length of the base member. For example rubber stops can be fastened to the bottom surface of the base member as an alternative to the legs 17 illustrated. The portion 18 of base 2 from the raised channel 11 or 12 to edge 4 or 5 will serve to enable additional support for the fish measuring device 1 during use. The fisherman's toes or hand can be placed on portion 18 to hold the fish measuring device steady if necessary. The flat base member 2 with or without support sections 16 allows the fish measuring device 1 to be placed on a seat or the floor of a boat or to sit evenly on any surface including river/lake banks or on ice to give a fast and accurate measurement.

The side containment means 10, in the embodiment shown, consists of two side members 19, 20. Side members 19,20, in the embodiment shown, each comprise a flat rectangular section 21 having top and bottom edges 22, 23 and first and second ends 24, 25. Side members 19, 20 are mounted to the base member 2 on an angle to provide a fish containment trough 26. In the embodiment shown the bottom edges 23 of side members 19, 20 are adapted to cooperate with means 9 to detachably retain the side members to the base member. In the embodiment illustrated flange 27 is provided along the bottom edge 23 of side members 19, 20. The flange 27 is sized and shaped to slide into slot 14 to detachably connect the side members 19, 20 to base member 2.

The top edge 22 of side members 19, 20 is adapted to cooperate with the sleeve member 28 and provide a hand grip for the fisherman to hold onto the fish measuring device when the device is submersed to allow non-regulation fish to be released. In the embodiment shown a lip 29 is provided along the top edge 22 of side members 19, 20. Lip 29 extends away from the fish containment trough 26. In the drawings lip 29 extends about a quarter of an inch from the flat portion 21. The hand grip on the top edge 22 of side members 19, 20 allow the fish measuring device to be held while it and the fish are immersed in the water and when the fish is ready it can swim away and the fisherperson can enjoy the sight. Other forms of hand grip other than lip 29 can be used. For example the hand grip could be holes or slots formed in the side members 19, 20 or handles provided on each side. Alternatively the hand grip can be on base member 2. The hand grip also allows a person to hold the device firmly so it can be thoroughly cleaned. The fishing measuring device 1 is preferably manufactured out of a material that is easily cleaned so that when stored, there will not be any residue left to cause contamination or odour.

Side members 19, 20 are preferably three inches high from the top edge 22 to bottom edge 23 and twenty-two inches from one end 24 to the other end 25. The flange 27 is angled so that the side members 19, 20 are angled from the vertical relative to base member 2. In the embodiment shown the side members 19, 20 are at an angle of about 70° to the top surface 8 of base member 2 so the top edges 22 of side members 19, 20 are three inches apart.

Measurement markings are placed on the inside surface 30, 31 of either or both side members 19, 20. The measurement markings are preferably in both metric and imperial measurements. In the embodiment shown the measurements are printed on a decal 32 applied by an adhesive or other suitable fastener to the inside surface 30, 31 of side members 19, 20. The decal 32 is preferably made of a material that will not shrink, crack or peel when exposed to the outdoors. The numbers and markings will not smear or fade. The adhesive should with withstand heat, cold, sun, water and scratching. Alternatively the measurement markings can be formed into the face of the side members.

A means for extending the fish containment trough, generally indicated at 28, is provided for measuring larger fish. By providing an extension means the length of the components is decreased simplifying transport and storage. The means for extending the fish containment trough in the embodiment shown consists of a sleeve member 28A adapted to fit between the two side members 19, 20. The sleeve member 28A has a first side section 33, floor portion 34 and second side section 35. Each of the first and second side sections 33, 35 have a top edge 36, 37 respectively and a bottom side 38 attached to the longitudinal edges 39, 40 of floor portion 34. The top edges 36, 37 of the first and second side sections 33,35 are adapted to fit over lip 29 on the top edges 22,23 of the side members 19, 20. In the embodiment shown in FIG. 6, the top edges 36, 37 of the first and second side sections 33, 35 are curled outwardly and downwardly to form a crook shape 41, 42. The crook 41, 42 fits over and under the lip 29 on the top edges 22, 23 of side members 19, 20. This design permits the sleeve member 28 to be easily installed or removed from the fish measuring device 1. A measuring decal 43 may be placed on the inside surface 44, 45 of either or both of first or second side sections 33, 35 of sleeve member 28A. The fish measuring decal is preferably similar to the decal 32 applied to the side members 19, 20. When measuring larger fish, the sleeve member 28A can be extended beyond either end 6, 7 of the base member 2. The markings on decal 43 combined with the markings on decal 32 give the length of the fish. The sleeve member in the embodiment shown is eighteen inches long and each side section is three inches high. A fold line 46 in the middle of floor portion 34 permits the sleeve member 28A to folded flat for storage or transport.

The fish measuring device is manufactured from environmentally friendly material, such as plastics, and will reduce the manhandling of fish that need to be returned to the water. The fish can be quickly placed into the fish measuring device, an accurate measurement taken and finally, live released as required. As a result, the fish measuring device will also reduce the time the fish is out of the water thereby increasing it's chances of survival. When the hook is removed, the fish will be placed into the trough on the fish measuring device with the tail to one end. The measuring decals on the sides of the fish measuring device and the sleeve can be arranged so that you can measure from either end. The fish will sit in the fish measuring device in a horizontal position to insure quick recovery and will reduce the possibility of the fish banging itself against the boat, on the ground where there may be rocks or on an ice surface during the winter months. There is no need to firmly grip the fish or stand on its tail for it to be measured. The present invention is very simple to use for any age group. Disadvantaged groups i.e. handicapped, illiterate can carry out the measurement process with ease as the measuring markings can be easily visualized and understood.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A fish measuring device comprising:
    a generally flat base member having top and bottom surfaces, first and second sides and first and second ends,
    two upstanding side members each having a bottom edge, top edge, first and second ends, an inside surface and an outside surface, said bottom edge of the upstanding side members adapted for detachable connection to the top surface of said base member;
    means on the top surface of said base member for detachably connecting in parallel the bottom edge of each of said two upstanding side members to the top surface of said base member, said bottom edges of the upstanding side members being attached to the means for detachably connecting, wherein each of said two upstanding side members are inclined outwardly from said bottom edge to said top edge;

wherein the inside surfaces of said two upstanding side members and the top surface of said base member between the bottom edges of said two upstanding side members define a fish containment trough open at each of the first and second ends of said base member;

a scale provided within said fish containment trough; and means for extending the fish containment trough to measure larger fish.

2. A fish measuring device according to claim 1 wherein the means for extending the fish containment trough consists of a sleeve member sized and adapted to fit in the fish containment trough between said two upstanding side members and slide relative to one of the ends of said base member.

3. A fish measuring device according to claim 2 wherein said sleeve member has a first side section having a top and bottom edge, a floor portion having parallel side edges and a second side section having a top and bottom edge, wherein the bottom edges of said first and second side sections are each attached to one of the parallel side edges of said floor portion and the top edge of each of said first and second side sections is adapted to fit over the corresponding top edges of said two upstanding side members.

4. A fish measuring device according to claim 3 wherein the top edge of said two upstanding side members has an outwardly extending lip.

5. A fish measuring device according to claim 1 wherein said means on the top surface of said base member for detachably connecting in parallel the bottom edge of each of said two upstanding side members to the top surface of said base member comprise two parallel channels on the top surface and running the length of said base member.

6. A fish measuring device according to claim 5 wherein said channels are raised from the top surface of said base member and each channel has peripheral walls that define a slot into which a corresponding tab portion on each of the two upstanding side members can be inserted.

7. A fish measuring device according to claim 5 wherein a flange is provided along each of the bottom edges of said two upstanding side members wherein said flanges are adapted to slide into the parallel channels on the top surface of said base member.

8. A fish measuring device according to claim 7 wherein said flanges provided along the bottom edges of said two upstanding side members are adapted so the two upstanding side members are inclined outwardly at an angle of about 70° from said base member.

9. A fish measuring device according to claim 1 wherein said two upstanding side members can be detached from the base member for transport or storage.

10. A fish measuring device according to claim 1 wherein said base member and said two upstanding side members are manufactured from environmentally friendly material that can be cleaned to prevent contamination and odour.

11. A fish measuring device according to claim 1 wherein said scale is placed on the inside surface of at least one of said two upstanding side members adjacent its top edge.

\* \* \* \* \*